United States Patent

[11] 3,590,851

| [72] | Inventors | Armen Bogossian<br>Teaneck, N.J.;<br>Henry H. Mackal, Fort Lauderdale, Fla. |
|---|---|---|
| [21] | Appl. No. | 750,507 |
| [22] | Filed | Aug. 6, 1968 |
| [45] | Patented | July 6, 1971 |
| [73] | Assignee | Halkey-Roberts Corporation<br>Paramus, N.J. |

[54] CHECK VALVE
10 Claims, 5 Drawing Figs.

[52] U.S. Cl. .................................................. 137/223,
137/541
[51] Int. Cl. .................................................. F16k 15/20
[50] Field of Search .................................... 137/223,
541, 542, 543, 543.13, 530, 533.17; 251/120, 323,
337, 149.6; 267/166, 178

[56] References Cited
UNITED STATES PATENTS
2,628,810 2/1953 Moore ........................... 137/542

| 3,351,081 | 11/1967 | Bogossian..................... | 137/541 |
| 3,396,743 | 8/1968 | Mackel......................... | 137/541 |

FOREIGN PATENTS

| 566,513 | 5/1923 | France .......................... | 251/149.6 |
| 622,346 | 3/1946 | England ....................... | 267/178 |

*Primary Examiner*—Laverne D. Geiger
*Assistant Examiner*—William H. Wright
*Attorney*—Alfred W. Vibber

ABSTRACT: A fluid check valve which may be employed, for example, as a mouth inflation valve for hollow inflatable articles. The valve has a hollow body within which an axially positioned valve element reciprocates between a forward, valve closed position, toward which it is constantly urged by a spring, and a rear, valve open position. The valve includes an improved means for guiding the forward end of the valve element within the valve body, said guiding means also serving as the seat for the forward end of the spring and for opening the valve when it is thrust rearwardly with respect to the valve body.

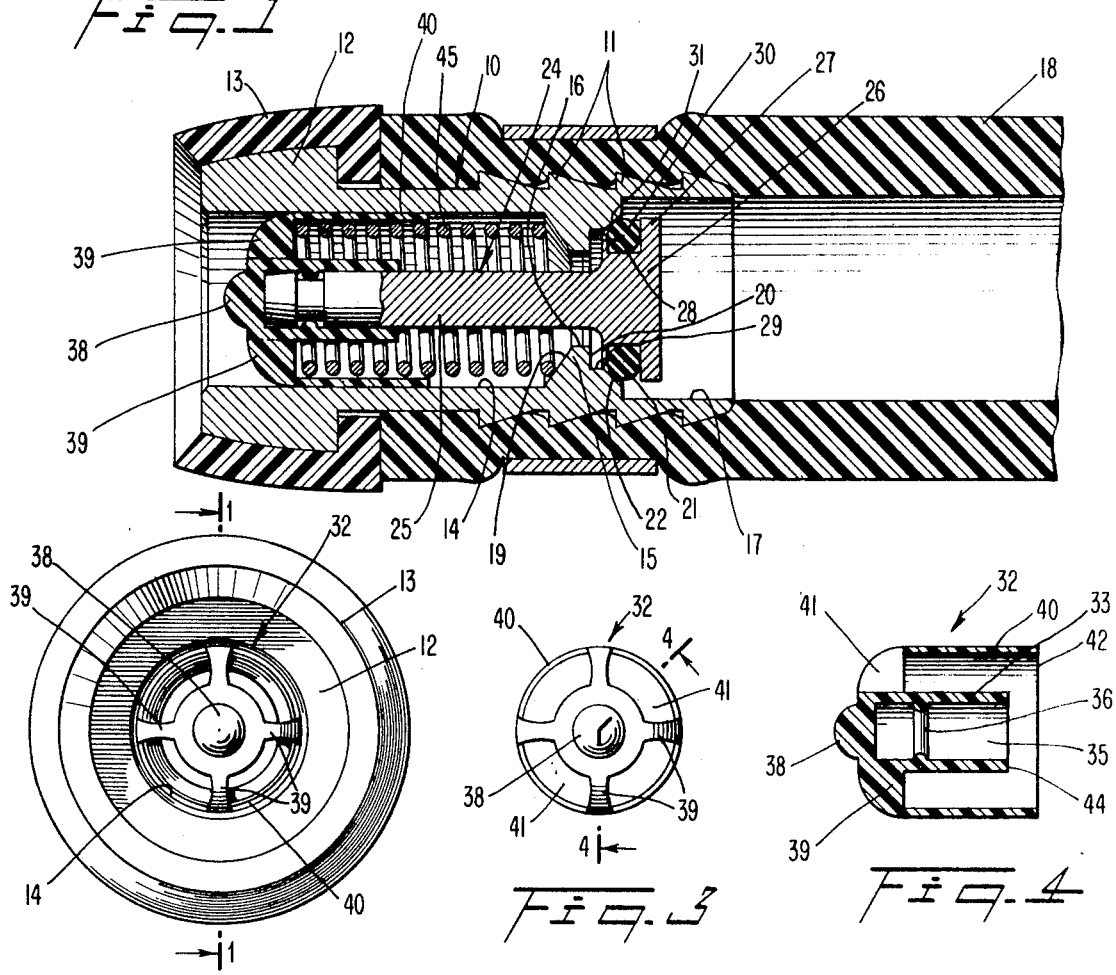
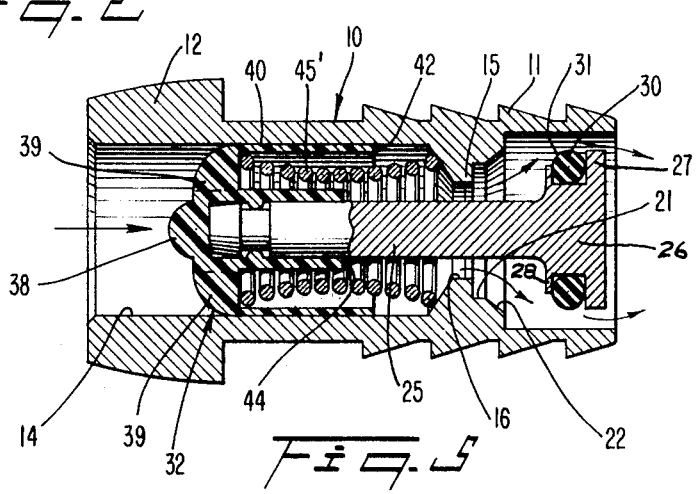
INVENTORS
ARMEN BOGOSSIAN
HENRY H. MACKAL
BY Alfred W. Nibber
ATTORNEY 3,590,851

CHECK VALVE

BACKGROUND OF THE INVENTION

1. Field of the invention

The invention relates to a fluid check valve which is adapted, among other uses, for employment as a mouth inflation valve for hollow inflatable articles.

2. Description of the Prior Art

The valve of the present invention represents an improvement upon that disclosed in the U.S. Pat. to Bogossian et al., No. 3,351,081, assigned to the assignee of the present application. More specifically, the valve of the present invention incorporates an improved means for guiding the forward end of the stem of the valve element with respect to the hollow valve body within which the valve element is disposed.

SUMMARY OF THE INVENTION

The valve of the present invention has a hollow body within which an axially positioned valve element reciprocates between a forward, valve closed potion, toward which it is constantly urged by a coil compression spring, and a rear, valve open position. In the illustrative embodiment, the passage through the valve body is provided with a transverse, annular radially inwardly directed flange having a first annular valve seat on its rear surface surrounding the passage through the flange. The valve element has an axially disposed stem projecting centrally through the passage in the flange, the stem having an enlarged head on its rear end, such head providing a second, forwardly facing valve seat cooperating with the first valve seat.

The stem of the valve element extends forwardly from the head to a location within and adjacent the forward end of the passage through the valve body. The stem-guiding means is secured to the forward end of the stem coaxially thereof, such means guidingly fitting within the passage in the valve body for reciprocation with the valve element relative to the valve body. The guiding means has a central sleeve telescoped over and secured to the forward end of the stem, and a plurality of radially outwardly directed wings on the central sleeve, such wings providing a plurality of axially directed passages between them, the outer surface of the central sleeve, and the surface of the passage through the valve body.

Bridging the outer ends of the wings is a second, axially directed outer sleeve which accurately fits within the passage in the valve body for reciprocation with respect thereto. The second sleeve, with the rear surfaces of the wings and the forward portion of the first sleeve, form a seat for the forward end of a coil compression spring which surrounds the valve stem and which constantly urges the valve element toward its valve closed position. The rear end of the second, outer sleeve, which extends substantially further rearwardly than the first, inner sleeve, abuts a radially outer zone of the forward surface of the flange in the valve body to stop rearward travel of the valve element past its fully valve open position.

The valve element guiding means of the present invention guides the valve stem smoothly in the passage in the valve body, with no possibility of localized wear or scratching of the surface of such passage. The outer sleeve on the guide means effectively centers the spring and holds it from any substantial contact with the passage in the valve body; it thus eliminates the possibility of the spring from becoming jammed against the wall of the passage or between the radially outer ends of the wings and the wall of the passage. Each time the valve element is moved into its fully open position, the outer sleeve not only positively isolates the spring from the wall of the passage in the valve body, but also substantially centers the rear end of the spring on the rear spring seat, formed by the forward surface of the flange in the valve body.

The outer sleeve makes it particularly easy accurately to assemble the forward end of the spring on the valve stem guiding means. When the valve is partially or fully opened, the outer sleeve provides a smooth path of fluid flow through the valve.

The outer sleeve is preferably made of such axial length as to stop the rearward travel of the valve element at the position wherein the valve presents the maximum effective area of fluid flow therethrough.

BRIEF DESCRIPTION OF THE DRAWING

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a view in axial section through a first illustrative embodiment of valve in accordance with the invention, the valve being shown in closed position and mounted within the outer end of a flexible inflation tube, likewise shown in axial section, the section being taken along the diametral line 1–1 of FIG. 2;

FIG. 2 is a view in end elevation of the valve and tube, the section being taken in the direction from left to right in FIG. 1;

FIG. 3 is a view in end elevation of the forward end of the guide member for the forward end of the inner, movable valve element, the view being taken similarly to FIG. 2;

FIG. 4 is a view in axial section through the valve element, the section being taken along the broken section line 4–4 of FIG. 3; and FIG. 5 is a view in axial section through a modification of the valve of the invention, the valve being shown with the valve element retracted to an intermediate open position and conducting fluid therethrough in a hollow article inflating direction.

DESCRIPTION OF THE PREFERRED EMBODIMENT

The illustrative valves shown herein are adapted for use with an inflatable hollow article such as a lifevest or liferaft. The embodiment of FIGS. 1—4, inclusive, on the one hand and that of FIG. 5, on the other, differ only as to the construction of the coil compression springs thereof. Each of such valves has an elongated generally circular cylindrical hollow body 10 with its rear end adapted for mounting within the outer end of an inflation tube 18. A plurality of axially spaced saw toothed shaped annular ridges 11 are provided on the rear end of body 10 so that the valve is securely held against axial withdrawal from the tube. An elongated, forwardly converging flanger 12 at the forward end of the body 10 receives a resilient mouthpiece 13; the main portion of the mouthpiece overlies and forcibly engages the flange 12, a rear, radially inwardly directed annular flange on the mouthpiece engaging the rear end surface of flange 12. The rear end surface of the flange on the mouthpiece is adapted to be engaged by the forward end of the inflation tube, whereby the mouthpiece is securedly held on the valve body.

The valve body has an axial bore 14 therein extending from the forward end of the body to an annular, inwardly extending flange 15 disposed intermediate the length of the valve body. Flange 15 has a short circular cylindrical inner edge portion 16 coaxial of bore 14 and defining a further portion of the passage through the valve body. Rearwardly of flange 15 the body 10 is provided with a bore 17 of somewhat greater diameter than bore 14 and extending to the rear end of the valve body.

The flange 15 has a rearwardly converging frustoconical forward surface 19 of large apex angle extending to the forward end of surface 16. The flange also has, in a direction from left to right in FIG. 1, a transverse annular shoulder 20 extending outwardly from the rear end of surface 16, a short circular cylindrical surface 21, and a rearwardly open, part-toroidal transverse annular surface 22 which forms a first, fixed seat of the valve.

Disposed axially within the valve body 10 for reciprocation with respect thereto is a valve element generally designated 24. Element 24 has an elongated stem 25 which extends centrally through the passage through flange 15, the rear end of the stem bearing a disclike head 26. Head 26, which is disposed rearwardly of flange 15, carries an O-ring 30 which forms the second, movable seat of the valve.

An annular, radially outwardly directed flange 27 coaxial of the head 26 forms the rear end of the head. An annular, radially outwardly directed flange 28 on head 26 is disposed forwardly of flange 27 and coaxially thereof, being spaced from flange 27 by an annular groove having a circular cylindrical root 29. An O-ring 30 is mounted in the groove on the head, the O-ring preferably being held under tension. The O-ring has a section generally complementary to the toroidal outer fixed valve seat 22, a forwardly facing outer part-toroidal zone 31 of the O-ring constituting the second, movable seat of the valve. The valve element 24 is constantly yieldingly urged forwardly toward its valve closed position, in which the valve seat 31 sealingly engages the valve seat 22, by a coil compression spring 45, to be described, which is preferably of small compressive force and readily overcome by the oral pressure of the user when the valve is being employed for mouth inflation. Such oral pressure in adults usually ranges from 0.4 to 0.6 p.s.i.g.

The forward end of stem 25 is guided axially of the bore 14 in the valve body by an integral guide member generally designated 32. Member 32 has a first, inner axially directed sleeve 33 disposed coaxial of bore 14, sleeve 33 having a rearwardly open central blind bore 35 therein, receiving the forward end of the stem 25. The member 32 is securely retained on the stem 25 by engagement between a transverse annular rib 36 on the inner wall of sleeve 33, such rib being snapped past the forward wall of a transverse annular groove in stem 25, the groove preferably receiving the rib with some axial and radial clearance. Centrally of its forward end the member 32 has a rounded projection 38 which lies within the valve body adjacent its forward end when the valve is closed, but close enough to the open end of the bore 14 to permit the valve element to be depressed to open the valve, for example, by one's finger tip.

Attached to the sleeve 33 are a plurality (four shown) of similar, equally angularly spaced, axially short radially outwardly projecting wings 39 which are here disposed in axial planes at right angles with respect to each other. The outer ends of the wings 39 are integrally attached to a second, outer axially directed thin-walled sleeve 40 which accurately and guidingly engages the wall of bore 14. There are thus provided four similar generally sector-shaped passages 41 bounded by sleeve 33, the sides of wings 39, and the inner surface of sleeve 40 through which fluid may pass into and out of the bore 14 in the valve body.

As above explained, the valve element 24 is constantly yieldingly urged toward its valve closed position, wherein the valve seats 22 and 31 are in sealing engagement, by a coil compression spring 45. The spring 45, which is of circular cylindrical shape, has a uniform outer diameter which is somewhat less than the inner diameter of sleeve 40, but appreciably greater than the outer diameter of sleeve 33, so that the forward end of the spring is readily assembled in the spring seat formed by the sleeves 33 and 40 and the wings 39. Not only that, but the turns of the spring at the forward end of the spring are freely movable axially of the spring within the spring seat as the spring is alternately compressed and allowed to expand, thereby insuring that spring as assembled on the spring seat has the proper action and compressive force. With former constructions of the forward spring seat, there was a possibility that the forward end of the spring might not be fully telescoped over the shouldered wall portion forming the forward spring seat on the stem-guiding member, and/or that the spring might bind upon the surface of the passage in the valve body.

The rear end of the spring 45 abuts the forward surface 19 of flange 15 in the valve body near but spaced from the radially outer edge of such surface by a distance somewhat exceeding the thickness of the wall of sleeve 40. Because of the fact that surface 19, which forms the rear seat for the spring, is frustoconical, the rear end of the spring inherently tends to center itself on its spring seat. In addition to this, every time that the valve element 24 moves rearwardly to either its rear terminal position or to an intermediate position, the outer sleeve 40 tends to realign the spring 45 axially and to center the rear end of the spring 45 on its seat. The sleeve 40 thus insures that the spring will not engage the wall of passage 14 and that the spring will remain free throughout its length for its normal, intended action.

The outer sleeve 40 is substantially longer than the sleeve 33, the rear end 42 of the sleeve 40 lying markedly further to the rear than the rear end 44 of sleeve 33. The end 42 engages the radially outer edge of the forward surface 19 of flange 15 to stop the valve element 24 at the end of its rearward travel with respect to the valve body. Preferably the outer sleeve 40 is made of such axial length that when the valve element is stopped by engagement of the rear end of such sleeve and flange 15, the valve presents the maximum effective fluid flow area therethrough. In such rear terminal position of the valve element, which is readily attained when the user blows strongly into the valve, the sleeve 40 and the surface 19 of flange 15 which it abuts act, in effect, as a conduit directing air rearwardly through the passage in the valve body. The spring 45, in the main, is disposed radially outwardly of the path of air through the valve; because sleeve 33 is substantially shorter than sleeve 40, even when the valve element 24 is in its rear terminal position the rear end of sleeve 33 lies substantially spaced forwardly of flange 15 and does not appreciably reduce the effective area of the path of fluid through the valve.

The member 32 is preferably made as an integral molding of a tough strong plastic material. An excellent material for this purpose is an acetal homopolymer resin such as that sold under the trade mark "Delrin 500." Such material has a low coefficient of friction, and high resilience and wear resistance. Because of its strength and toughness, the first or outer sleeve 40 may be made with a thin radial thickness, for example 0.015inch, so that its presence in the bore 14 does not appreciably reduce the effective cross-sectional area of the passage through bore 14 of the valve body.

The valve shown in FIG. 5, wherein the valve element is in an intermediate, open position, differs from that of FIGS. 1—4, inclusive, only in the construction of the coil compression spring. In the embodiment of FIGS. 1—4, inclusive, the spring 45 is generally of circular cylindrical configuration, whereas in FIG. 5 the spring 45′ is of hourglass shape. The hourglass configuration of spring 45′ insures that the turns or coils of the spring which are located intermediate the length of the spring will remain free or substantially free from contact with the inner wall of the sleeve 40 at all times, despite the inherent increase in the outer diameter of the spring as the spring is compressed. Thus all of the turns of the spring remain fully effective at all times. Instead of making the coil compression spring of the hourglass configuration shown, it may be made of frustoconical shape, converging to the right, with its left-hand end of an outer diameter which is slightly less than the inner diameter of sleeve 40 and its right-hand end of an outer diameter somewhat larger than the diameter of the central passage 16 through the flange 15. In a further, alternative embodiment, the coil compression spring may be made of generally circular cylindrical configuration but of somewhat small outer diameter than spring 45′, the left-hand end of the spring being centered with respect to the valve element and held free from contact with the inner surface of sleeve 40 by recesses in the rear surfaces of wings 39, such recesses being disposed in a circle and receiving the left-hand end of the spring.

Although only one embodiment of the invention has been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art.

I claim:

1. In a fluid check valve having a body having a fluid-conducting passage therethrough, a first, rearwardly facing annular valve seat disposed transversely of the passage, the portion of the passage forwardly of the first valve seat being a circular cylindrical bore coaxial of the first valve seat, a reciprocable valve element within the body, said valve element having a head disposed rearwardly of the first valve seat and carrying a second, forwardly facing annular valve seat selectively engaging the first valve seat to close the valve and movable rearwardly to open the valve, a stem centrally connected to the head and extending forwardly therefrom through the first valve seat coaxially of the first valve seat and of the bore in the body, means connected to the forward end of the stem centering the forward end of the stem with respect to the bore and accurately guiding it for reciprocation with respect to the bore, and yieldable means constantly urging the valve element forwardly toward its valve closed position, the improvement which comprises, the guiding and centering means for the forward end of the stem having a central portion secured to the stem, said central portion having a plurality of angularly spaced wings which are generally radially outwardly directed toward the bore in the body, and a thin-walled circular cylindrical sleeve accurately fitting within the bore for reciprocation longitudinally with respect thereto, the sleeve being attached to and bridging the outer ends of the wings.

2. A valve according to claim 1, wherein the central portion of the stem guiding and centering means is a second sleeve telescopically receiving the stem, the wings extend outwardly from the second sleeve, and the first recited sleeve is attached at its forward end to the outer ends of the wings.

3. A valve according to claim 2, wherein the wings are attached to and extend outwardly from the forward end of the second sleeve.

4. A valve according to claim 2, wherein the yieldable means is a longitudinally disposed coil compression spring which is telescoped within the bore, the forward end of the spring being received within a spring seat formed by the confronting inner and outer sidewalls of the first and second sleeves and the rear end surfaces of the wings, said spring having an outer diameter which is somewhat less than the inner diameter of the first sleeve.

5. A valve according to claim 4, comprising a transverse annular radially inwardly extending flange at the rear of the bore in the valve body, said flange having a central passage therethrough through which the stem of the valve element centrally extends, the first valve seat being formed as a portion of the rear surface of said flange, and wherein the forward surface of said flange forms a seat for the forward end of the spring.

6. A valve according to claim 5, wherein the rear end of the first sleeve lies a substantial distance rearwardly of the second sleeve, and the rear end of the first sleeve engages the peripherally outer edge of the forward surface of the flange when the valve element is thrust rearwardly into its fully open position.

7. A valve according to claim 5, wherein the forward surface of said flange is in the form of a rearwardly converging frustum of a cone coaxial of the bore.

8. A valve according to claim 7, wherein the rear end of the first sleeve lies a substantial distance rearwardly of the second sleeve, and the rear end of the first sleeve engages the peripherally outer edge of the forward surface of the flange when the valve element is thrust rearwardly into its fully open position.

9. A valve according to claim 4, wherein the coil compression spring has a diameter which varies along the length thereof, the outer diameter of intermediate portions of the spring being less than that of the forward end of the spring.

10. A valve according to claim 9, wherein the coil compression spring is of hourglass shape.